US012754732B2

(12) United States Patent
Rae et al.

(10) Patent No.: US 12,754,732 B2
(45) Date of Patent: Oct. 6, 2026

(54) SYSTEMS AND METHODS FOR PUBLIC CLOUD SERVICE DATA QUERYING

(71) Applicant: JPMORGAN CHASE BANK, N.A., New York, NY (US)

(72) Inventors: Alasdair Rae, Glasgow (GB); Ganesh Prabhu, Glasgow (GB); David Thomson, Glasgow (GB); Donnie Kennedy, Glasgow (GB); Ellis Gowan, Glasgow (GB); Krzysztof Malinowski, Glasgow (GB); Sean Oneill, Glasgow (GB); Kaushik Nimmala, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 811 days.

(21) Appl. No.: 18/051,348

(22) Filed: Oct. 31, 2022

(65) Prior Publication Data

US 2024/0143316 A1 May 2, 2024

(51) Int. Cl.
*G06F 8/70* (2018.01)

(52) U.S. Cl.
CPC .................................... *G06F 8/70* (2013.01)

(58) Field of Classification Search
CPC .................................................... G06F 8/70
See application file for complete search history.

(56) References Cited

U.S. PATENT DOCUMENTS 9,213,540 B1 * 12/2015 Rickey ...................... G06F 8/71
2005/0086285 A1 * 4/2005 Balasubramanian ........................ G06F 9/5038 709/200

(Continued)

FOREIGN PATENT DOCUMENTS

WO WO-2022076055 A1 * 4/2022 ............ G06F 9/542

OTHER PUBLICATIONS

Naeem, M. Asif, Gillian Dobbie, and Gerald Webber. “An event-based near real-time data integration architecture.” 2008 12th Enterprise Distributed Object Computing Conference Workshops. IEEE, 2008. (Year: 2008).*

Solomi, V. Sherlin, and D. Stela. “Implementation of HUB and Spoke Topology in VPN Using EIGRP.” 2021 Sixth International Conference on Wireless Communications, Signal Processing and Networking (WiSPNET). IEEE, 2021. (Year: 2021).*

Reithinger, Norbert, and Daniel Sonntag. “An integration framework for a mobile multimodal dialogue system accessing the semantic web.” Interspeech 2005. (Year: 2005).*

*Primary Examiner* — Joanne G MacAsiano
(74) *Attorney, Agent, or Firm* — GREENBERG TRAURIG LLP

(57) ABSTRACT

In some aspects, the techniques described herein relate to a method including calling, by a first event driven function associated with a spoke account, an inventory interface of the spoke account; writing, by the first event driven function, inventory data received from the inventory interface to a messaging queue, wherein the messaging queue is associated with a hub account; receiving, by a second event driven function, the inventory data from the messaging queue, wherein the second event driven function is associated with the hub account; writing, by the second event driven function, the inventory data to a database, wherein the database is associated with the hub account; executing, by a third event driven function, a query of the database, wherein the query retrieves the inventory data, and wherein the third event driven function is associated with an administrative account; and displaying the inventory data via a front-end application.

18 Claims, 3 Drawing Sheets

(56) References Cited

U.S. PATENT DOCUMENTS

| | | | | |
|---|---|---|---|---|
| 2014/0173702 | A1* | 6/2014 | Wong | H04L 63/0281 726/4 |
| 2015/0304174 | A1* | 10/2015 | Zhao | H04L 12/4633 709/226 |
| 2016/0127454 | A1* | 5/2016 | Maheshwari | G06F 8/30 709/223 |
| 2017/0034137 | A1* | 2/2017 | Pillai | H04L 63/0435 |
| 2022/0107853 | A1* | 4/2022 | Kampmann | G06Q 10/103 |
| 2023/0153413 | A1* | 5/2023 | Karlsson | G06F 21/335 726/4 |
| 2024/0015091 | A1* | 1/2024 | Shankar | H04L 63/0236 |

* cited by examiner

SYSTEMS AND METHODS FOR PUBLIC CLOUD SERVICE DATA QUERYING

BACKGROUND

1. Field of the Invention

Aspects generally relate to systems and methods for public cloud service data querying.

2. Description of the Related Art

Users/developers of an organization who develop applications for public cloud services generally deploy an application to a public cloud service under a corresponding account. That is, applications deployed to public cloud services, and application accounts registered with the public cloud service, exist in a 1-to-1 ratio, where, for each application deployed, there exists an associated application account registered with the public cloud service. Consequently, as the number of applications that a given developer deploys to a public cloud service grows, the number corresponding accounts also grows.

An administrative and managerial challenge arises for developers, since developers generally track and maintain applications based on internal identifications associated with development projects. Developers do not have an efficient way to understand what applications are running on which public cloud service accounts, since account names are generally nondescriptive (e.g., random auto-generated alphanumeric numbering) and can be quite numerous. This may be the case regardless of how the applications have been provisioned with respect to internal controls. Moreover, there may be a considerable lack of comfort with public cloud service consoles and/or dashboards, which may compound and frustrate developers' lack of administrative knowledge regarding account numbers that correspond to applications, leading to more confusion and less transparency regarding how many accounts/applications developers have provisioned and are responsible for. Innovations that allow for fast and simple identification of an application's corresponding public cloud service account information may be highly valued in general, and particularly with respect to application management and lifecycle events such as, deployments, upgrades, refactoring operations, migrations, end of life (EOL) operations, etc.

SUMMARY

In some aspects, the techniques described herein relate to a method, including: calling, by a first event driven function associated with a spoke account, an inventory interface of the spoke account, wherein the spoke account is provided by a public cloud service; writing, by the first event driven function, inventory data received from the inventory interface to a messaging queue, wherein the messaging queue is associated with a hub account, and wherein the hub account is provided by the public cloud service; receiving, by a second event driven function, the inventory data from the messaging queue, wherein the second event driven function is associated with the hub account; writing, by the second event driven function, the inventory data to a first database, wherein the first database is associated with the hub account; executing, by a third event driven function, a first query of the first database, wherein the first query retrieves the inventory data, and wherein the third event driven function is associated with an administrative account provided by the public cloud service; and displaying the inventory data via a front-end application.

In some aspects, the techniques described herein relate to a method, wherein the spoke account, the hub account, and the administrative account are associated with a subscribing organization.

In some aspects, the techniques described herein relate to a method, wherein the first event driven function, the second event driven function, and the third event driven function are provided by the subscribing organization.

In some aspects, the techniques described herein relate to a method, wherein the spoke account is configured to execute an associated cloud application.

In some aspects, the techniques described herein relate to a method, wherein the associated cloud application is provided by the subscribing organization.

In some aspects, the techniques described herein relate to a method, wherein the front-end application is a cloud application associated with the administrative account.

In some aspects, the techniques described herein relate to a method, including: authenticating, by the front-end application, a user of the front-end application, and determining, based on the authenticating, an identifier of the user.

In some aspects, the techniques described herein relate to a method, including: executing, by the front-end application, a query of a second database, wherein the second database is hosted on a backend of the subscribing organization, and wherein the query retrieves an identifier of the spoke account based on the identifier of the user.

In some aspects, the techniques described herein relate to a method, wherein the first query retrieves the inventory data based on the identifier of the spoke account.

In some aspects, the techniques described herein relate to a method, wherein the inventory data includes one of a name and an identifier of the associated cloud application.

In some aspects, the techniques described herein relate to a system including one or more computer processors, wherein the one or more computer processors are configured as a public cloud service, and wherein the one or more computer processors are configured to: call, by a first event driven function associated with a spoke account, an inventory interface of the spoke account, wherein the spoke account is provided by the public cloud service; write, by the first event driven function, inventory data received from the inventory interface to a messaging queue, wherein the messaging queue is associated with a hub account, and wherein the hub account is provided by the public cloud service; receive, by a second event driven function, the inventory data from the messaging queue, wherein the second event driven function is associated with the hub account; write, by the second event driven function, the inventory data to a first database, wherein the first database is associated with the hub account; execute, by a third event driven function, a first query of the first database, wherein the first query retrieves the inventory data, and wherein the third event driven function is associated with an administrative account provided by the public cloud service; and displaying the inventory data via a front-end application.

In some aspects, the techniques described herein relate to a system, wherein the spoke account, the hub account, and the administrative account are associated with a subscribing organization.

In some aspects, the techniques described herein relate to a system, wherein the first event driven function, the second event driven function, and the third event driven function are provided by the subscribing organization.

In some aspects, the techniques described herein relate to a system, wherein the spoke account is configured to execute an associated cloud application.

In some aspects, the techniques described herein relate to a system, wherein the associated cloud application is provided by the subscribing organization.

In some aspects, the techniques described herein relate to a system, wherein the front-end application is a cloud application associated with the administrative account.

In some aspects, the techniques described herein relate to a system, wherein the one or more computer processors are configured to: authenticate, via the front-end application, a user of the front-end application, and determine, based on the authentication, an identifier of the user.

In some aspects, the techniques described herein relate to a system, wherein the one or more computer processors are configured to: execute, by the front-end application, a query of a second database, wherein the second database is hosted on a backend of the subscribing organization, and wherein the query retrieves an identifier of the spoke account based on the identifier of the user.

In some aspects, the techniques described herein relate to a system, wherein the first query retrieves the inventory data based on the identifier of the spoke account.

In some aspects, the techniques described herein relate to a system, wherein the inventory data includes one of a name and an identifier of the associated cloud application.

DETAILED DESCRIPTION

Figure 1:
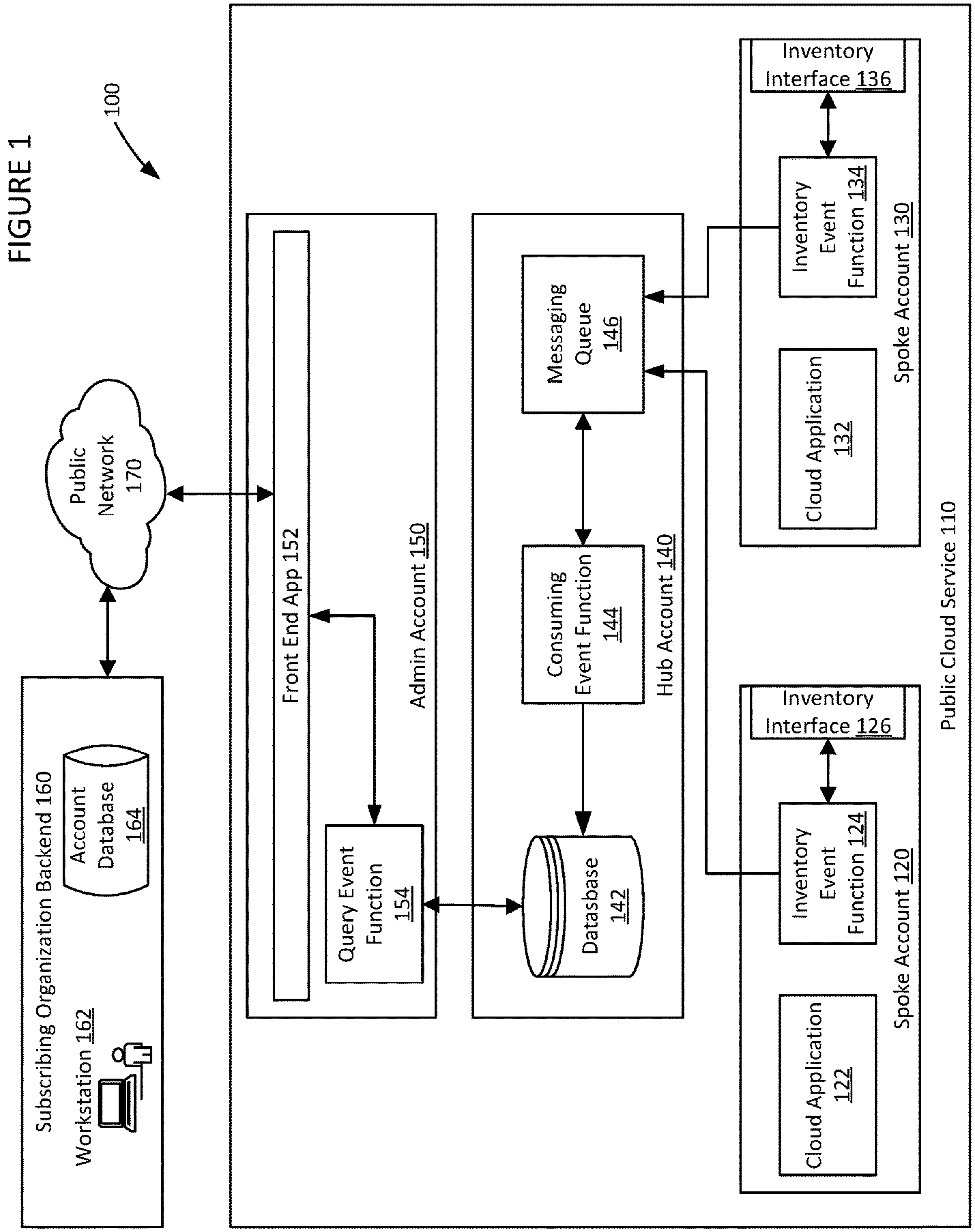
FIG. 1 is a block diagram of a system for public cloud service data querying, in accordance with aspects.

Aspects are generally directed to systems and methods for public cloud service data querying. Systems and methods described herein provide for seamless and frictionless querying of public cloud service administrative, account, and other exposed data with respect to applications that are deployed to, and execute, thereon.

In accordance with aspects, application owners deploy applications to spoke accounts of a public cloud service. In many aspects, there is generally a single application deployed to a single spoke account. Spoke accounts may be managed via a hub account that is provided by the public cloud service. One hub account may be in operative communication with and manage many spoke accounts. A hub account may provide a platform for technical administrative tasks regarding spoke accounts. For example, during deployment of an application or an application update, the application or update may be provided via a hub account, and the hub account may push the application update to the spoke account associated with the hub account for deployment. This may be done via administrative and management applications executing on the hub account. Hub and spoke accounts are also able to pass data back and for to each other, and the hub account may handle further processing of administrative and managerial data received from associated spoke accounts.

Some public cloud service providers offer a function-as-a-service product, through which a subscribing organization can provide compact, self-contained pieces of executable program code to be executed on the occurrence of a predefined event (referred to herein as an event driven function). Computing resources required to run an event driven function are managed by the public cloud service, so the subscribing organization does not have to consider allocation of such resources. The subscribing organization may provide the event driven function, associate the event driven function with a public cloud service account, and define a trigger event that triggers the event driven function to execute. The public cloud service manages allocation of hardware resources to execute the event driven function.

In accordance with aspects, spoke accounts may expose a set of parameters that provide data related to the spoke account via an inventory interface (e.g., an application programming interface (API) interface). Exposed data may include inventory metadata such as a name and identifier of a deployed application, an account identifier of the spoke account, processor utilization, storage utilization, etc. A subscribing organization may deploy an event-driven function that is associated with a spoke account, and may make calls (e.g., API calls) to the inventory interface, which calls may return exposed data to the event driven function. The event driven function may be triggered by a time event. That is, the event driven function may be triggered on a periodic time basis, such as hourly, daily, weekly, etc.

In accordance with aspect, a hub account may be configured with different applications and storage modules that facilitate inventory data management. For instance, a hub account may be configured with a messaging queue application, event driven functions, and a persistent datastore, such as a relational database.

A messaging queue may be configured as a queue data structure and may facilitate communication between disparate systems or services. Services may place messages on the queue and may subscribe to and consume messages from the queue. A service or application that submits messages to a messaging queue is referred to as a producer, and a service or application that consumes messages from a messaging queue is referred to as a consumer. The communication may be asynchronous. That is, the messages may be placed on the queue by one service at one time and may be consumed from the queue by another service at another time, and a producer need not wait for a response from a consumer before continuing with other processing tasks. The messaging queue stores the message until the consumer consumes it. The messaging queue may include a message broker. A message broker can translate a message from a protocol or format that it is received in from the producer to a protocol or format that it is consumed in by the consumer.

In accordance with aspects, a hub account may be configured with a message queue that receives inventory data as messages from an event driven function associated with a spoke account. That is an event driven function associated with a spoke account may act as a producer for a messaging queue associated with a hub account.

In accordance with aspects, a hub account may further be associated with an event driven function that acts as a consumer of the messaging queue. An event driven function may be configured to consume inventory data from a messaging queue and write the inventory data to a datastore, such as a relational data base. An inventory message may include any inventory data that is exposed by the inventory interface of a spoke account. For instance, an event driven function may consume a message including an identifier of a spoke account, such as an account number, an application that is deployed to the account, and other account inventory information. The event driven function may then make a write to a relational database that is associated with the hub account. The write may include a structured query language (SQL) command, or another appropriate write commend for a given datastore.

In some aspects, a message broker of the messaging queue may be configured to format the inventory data into appropriate data steps to be written to a datastore. For example, an application name may be formatted as a string to accommodate a string field in the relational database, and an spoke account number may be formatted as an integer, a string, or another appropriate data type for storage in a relational database.

In accordance with aspects, an administrative account may be configured by a subscribing organization as an additional account provided by the public cloud service. An administrative account may be a custom account created by a subscribing organization to provide access to administrative-type data such as inventory data provided by numerous spoke accounts of the subscribing organization. An administrative account may be configured with a front-end application that may be accessed by end users (e.g., developer users) of a subscribing organization.

An administrative account may also be associated with event-driven functions. In accordance with aspects, an administrative account may be configured with an event driven function that is configured to perform a read operation on a database that is associated with a hub account. For example, an event driven function may perform a SQL read command that returns data specified in the SQL command to the event-driven function. An event-driven function may be configured to make data retrieved from a hub account datastore available to a front-end application, which application may format the retrieved data for display to an end user via a user interface, such as a graphical user interface.

In accordance with aspects, a front-end application may authenticate a user in order to identify a user and capture a user identifier (ID) such as a username, a related user ID, etc. The front-end application may use any suitable authentication technique. The front-end application may have access to and be in operative communication with systems and services executing on a backend technology infrastructure of a subscribing organization. For instance, a front-end application executing on a public cloud service and associated with an administrative account of the public cloud service may have access to a datastore that resides and executes on a subscribing organization's technology backend. An organization's backend database may store all spoke account identifiers that are related to a user identifier. The front-end application may use a user identifier as a lookup key to query a backend database of the subscribing organization. A query may return all spoke account identifiers that an identified user is associated with (e.g., that an identified user is responsible for).

In accordance with aspects, a front-end application may use data returned from a query of a backend database of a subscribing organization to retrieve inventory data for spoke accounts that are related to an identified user. A front-end application may use spoke account identifiers to query a database associated with a hub account, where the query returns inventory data related to the spoke account identifier specified as a key in the query. The front-end application may then format the inventory information for display to the authenticated user, thereby providing the authenticated user with inventory information for spoke accounts having applications associated therewith that the authenticated user is associated with (e.g., responsible for).

FIG. 1 is a block diagram of a system for public cloud service data querying, in accordance with aspects. System 100 includes public cloud service 110. Public cloud service 110 may provide remote software, platform and/or infrastructure-as-a-service services to subscribing organizations. System 100 further includes subscribing organization backend 160. Subscribing organization backend 160 subscribes to the public cloud services provided by public cloud service 110. Subscribing organization backend 160 access public cloud service 110 via public network 170. Public network 170 may be any suitable public network, such as the internet.

Public cloud service 110 and subscribing organization backend 160 represent the technology infrastructures of respective organizations. These infrastructures include servers, computers, software applications, computer network mediums, and computer networking hardware and software for providing electronic services based on computer software applications executing on requisite hardware. Exemplary hardware and software include webservers, application servers, communication servers such as email servers and SMS servers, network routers, switches and firewalls, custom-developed software applications including hardware to execute them on, etc. These respective infrastructures provide private, internal communication networks over which the various electronic components communicate, along with interfaces to public networks for intercommunication with other infrastructures.

Public cloud service 110 includes spoke account 120 and spoke account 130. Spoke account 120 and spoke account 130 are spoke accounts associated with subscribing organization backend 160. Spoke account 120 is associated with cloud application 122. Subscribing organization backend 160 deploys cloud application 122 to execute on spoke account 120. Likewise, spoke account 130 is associated with cloud application 132. Subscribing organization backend 160 deploys cloud application 132 to execute on spoke account 130. Spoke account 120 provides inventory interface 126 and spoke account 130 provides inventory 136. Inventory interface 126 and inventory 136 expose inventory data associated with spoke account 120 and spoke account 130, respectively.

Inventory event function 124 is associated with spoke account 120. Inventory event function 124 is an event-driven function. Inventory event function 124 is provided by subscribing organization backend 160 and configured to make calls to inventory interface 126. Inventory interface 126 responds to calls (e.g., API method calls) by returning inventory data that is specified in the call. For instance, inventory event function 124 may make a call to inventory interface 126 and specify a request for an application name or application ID that is associated with spoke account 120, an account identifier of spoke account 120, an amount of processor utilization of spoke account 120, an amount of volatile memory utilization of spoke account 120, an amount of non-volatile memory utilization of spoke account 120, and/or other inventory data that is associated with spoke account 120.

Likewise, Inventory event function 134 is associated with spoke account 130. Inventory event function 134 is an event-driven function. Inventory event function 134 is provided by subscribing organization backend 160 and configured to make calls to inventory interface 136. Inventory interface 136 responds to calls (e.g., API method calls) by returning inventory data that is specified in the call. For instance, inventory event function 134 may make a call to inventory interface 136 and specify a request for an application name or application ID that is associated with spoke account 130, an account identifier of spoke account 130, an amount of processor utilization of spoke account 130, an amount of volatile memory utilization of spoke account 130, an amount of non-volatile memory utilization of spoke account 130, and/or other inventory data that is associated with spoke account 130.

Public cloud service 110 further includes hub account 140. Hub account 140 is configured as associated with database 142, messaging queue 146, and consuming event function 144. Hub account 140 is associated as a management account for spoke account 120 and spoke account 130. Messaging queue 146 is configured to receive inventory data from inventory event function 124 and inventory event function 134 as messages and write the inventory data messages to it queue. Inventory event function 124 and inventory event function 134 are configured as producers for messaging queue 146.

Consuming event function 144 is an event driven function that is configured as a consumer of messaging queue 146. Consuming event function 144 subscribes to and receives messages from message queues populated by inventory event function 124 and inventory event function 134. Consuming event function 144 may have execution triggered by a message pushed from queue 146. Alternatively, execution may be triggered on a periodic basis, in which case consuming event function 144 may poll message queues to which it is subscribed. Consuming event function 144 is also configured to write inventory information included in received messages to database 142. For instance, consuming event function 144 may write inventory information from inventory event function 124 to database 142 in a table and may specify an account identifier of spoke account 120 as a key with which to look up associated inventory information associated with spoke account spoke account 120 and/or cloud application 122. Consuming event function 144 may also write inventory information from inventory event function 134 to database 142 in the same manner. In some aspects, a message broker of queue 146 may format incoming messages containing inventory information from inventory event function 124 and inventory event function 134 into a suitable format or data type from writing by consuming event function 144 to database 142.

With continued reference to FIG. 1, Admin account 150 is an administrative account provided by public cloud service 110 and associated with subscribing organization backend 160. Subscribing organization backend 160 may configure admin account 150 for providing end user access to inventory data from various spoke accounts (e.g., spoke account 120 and spoke account 130). Admin account 150 may be configured with front-end app 152 and query event function 154. Front-end app 152 is an application configured to be accessed by users from subscribing organization backend 160 via public network 170. For instance, a user of subscribing organization backend 160 may access front-end app 152 from workstation 162 via an interface provided by front-end app 152. Front-end app 152 may be configured with authentication services that may identify a user with, e.g., a username or a user identifier.

In accordance with aspects, front-end app 152 may be configured to access other systems and services resident on subscribing organization backend 160. Front-end app 152 may be in operative communication with account database 164. Account database 164 may be configured to store spoke account identifiers of spoke accounts provided by public cloud service 110 and associated with subscribing organization backend 160. Account database 164 may store spoke account identifiers with a relationship or association to a user identifier. The relationship may indicate that a user associated with the user identifier related to the spoke account identifier is responsible for the spoke account and applications deployed thereto. Front-end app 152 may be configured to query account database 164 using a determined user identifier as a lookup key to return each spoke account identifier related to the user identifier.

Query event function 154 is an event driven function that is configured to query database 142 upon a triggering event supplied by front-end app 152. For instance, front-end app 152 may trigger query event function 154 with provision of one or more spoke account identifiers. Query event function 154 may be configured to query database 142 using the provided spoke account identifiers as a lookup key to retrieve inventory data stored with a relation or association to the provided spoke account identifier. Query event function 154 may be configured to return the retrieved spoke account data for each provided spoke account identifier to front-end app 152.

Front-end app 152 may be configured to format the received spoke account inventory data for display via its user interface. In this manner, front-end app 152 may display to an authenticated user of subscribing organization backend 160 inventory data, including application names, application versions, resource usage and other inventory data for each spoke account that the user is responsible for managing.

Figure 2:
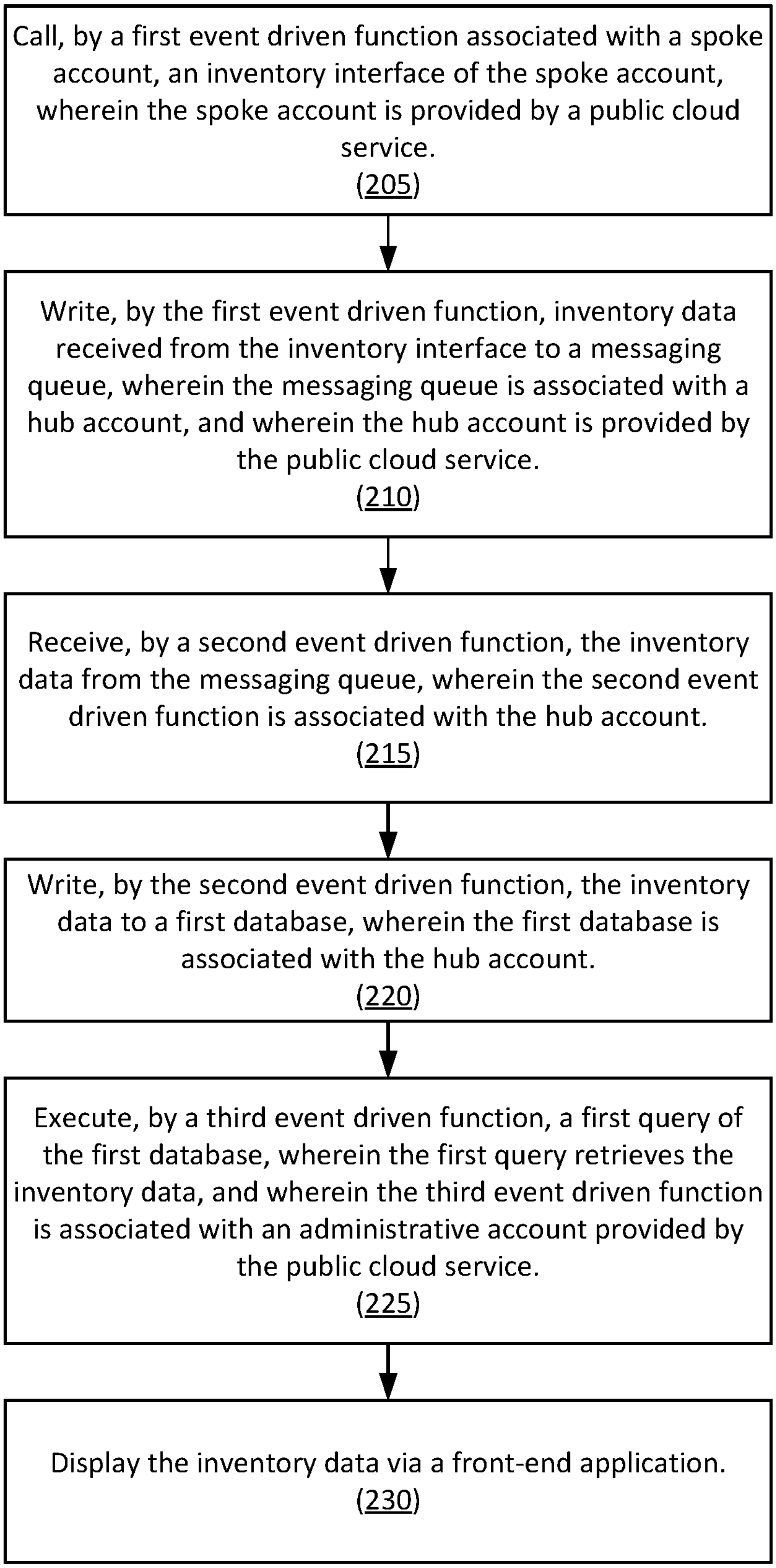
FIG. 2 is a logical flow for providing public cloud service data querying, in accordance with aspects.

FIG. 2 is a logical flow for providing public cloud service data querying, in accordance with aspects.

Step 205 includes calling, by a first event driven function associated with a spoke account, an inventory interface of the spoke account, wherein the spoke account is provided by a public cloud service.

Step 210 includes writing, by the first event driven function, inventory data received from the inventory interface to a messaging queue, wherein the messaging queue is associated with a hub account, and wherein the hub account is provided by the public cloud service.

Step 215 includes receiving, by a second event driven function, the inventory data from the messaging queue, wherein the second event driven function is associated with the hub account.

Step 220 includes writing, by the second event driven function, the inventory data to a first database, wherein the first database is associated with the hub account.

Step 225 includes executing, by a third event driven function, a first query of the first database, wherein the first query retrieves the inventory data, and wherein the third event driven function is associated with an administrative account provided by the public cloud service.

Step 230 includes displaying the inventory data via a front-end application.

Figure 3:
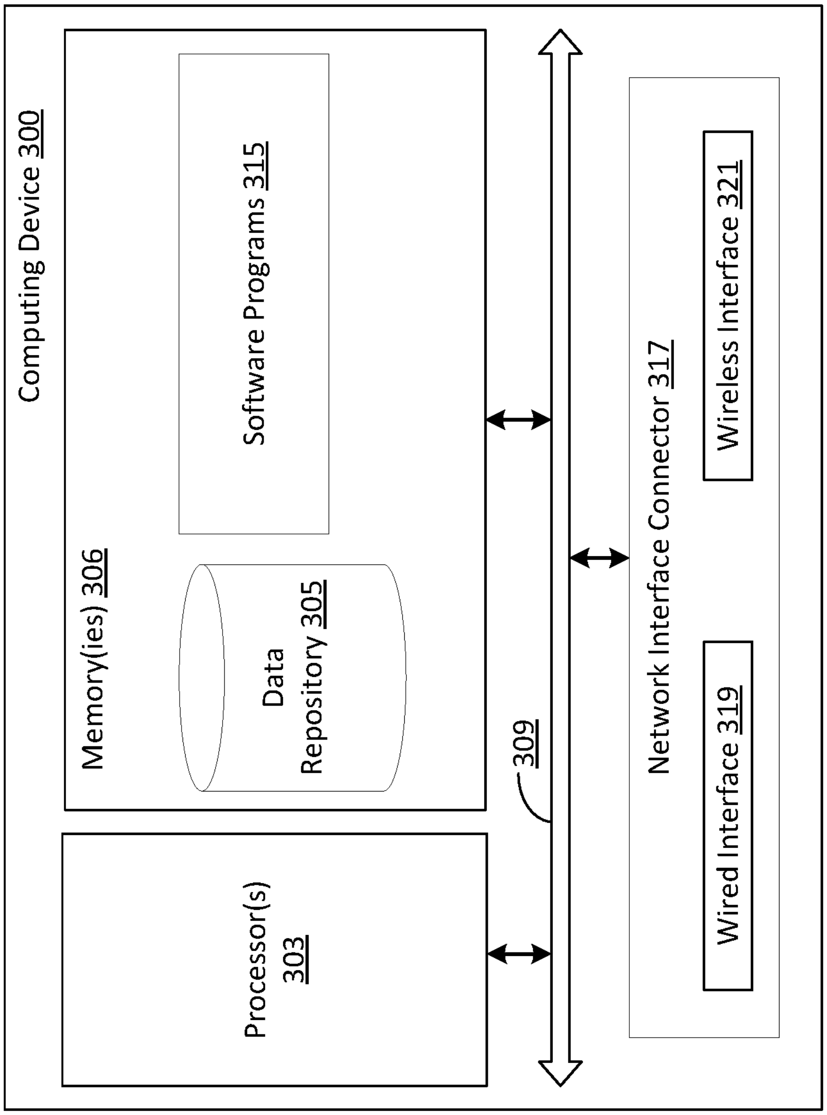
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as applications, event-driven functions, database servers, and computer applications may include, and/or execute on, components and configurations like, or similar to, computing device 300. Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method, comprising:

calling, by a first event driven function associated with a spoke account, an inventory interface of the spoke account, wherein the spoke account is provided by a public cloud service and is a first cloud account having a first cloud-provider account identifier;

writing, by the first event driven function, inventory data received from the inventory interface to a messaging queue, wherein the messaging queue is associated with a hub account, wherein the hub account is provided by the public cloud service, wherein the first event driven function invokes an inventory API that provides an application identifier;

receiving, by a second event driven function, the inventory data from the messaging queue, wherein the second event driven function is associated with the hub account;

writing, by the second event driven function, the inventory data to a first database, wherein the first database is associated with the hub account;

executing, by a third event driven function, a first query of the first database, wherein the first query retrieves the inventory data, wherein the third event driven function is associated with an administrative account provided by the public cloud service, wherein the hub account is a second cloud account having a second cloud-provider account identifier, and wherein each message written to the messaging queue includes message metadata comprising an identifier of the spoke account that wrote the message;

executing, by a front-end application, a second query of a second database, wherein the second database is hosted on a backend of a subscribing organization, and wherein the second query retrieves the identifier of the spoke account based on an identifier of a user; and displaying the inventory data via the front-end application.

2. The method of claim 1, wherein the spoke account, the hub account, and the administrative account are associated with the subscribing organization.

3. The method of claim 2, wherein the first event driven function, the second event driven function, and the third event driven function are provided by the subscribing organization.

4. The method of claim 3, wherein the spoke account is configured to execute an associated cloud application.

5. The method of claim 4, wherein the associated cloud application is provided by the subscribing organization.

6. The method of claim 5, wherein the inventory data includes an application name.

7. The method of claim 2, wherein the front-end application is a cloud application associated with the administrative account.

8. The method of claim 7, comprising:

authenticating, by the front-end application, the user of the front-end application, and determining, based on the authenticating, the identifier of the user.

9. The method of claim 1, wherein the first query retrieves the inventory data based on the identifier of the spoke account.

10. A system comprising one or more computer processors, wherein the one or more computer processors are configured as a public cloud service, and wherein the one or more computer processors are configured to:

call, by a first event driven function associated with a spoke account, an inventory interface of the spoke account, wherein the spoke account is provided by the public cloud service and is a first cloud account having a first cloud-provider account identifier;

write, by the first event driven function, inventory data received from the inventory interface to a messaging queue, wherein the messaging queue is associated with a hub account, wherein the hub account is provided by the public cloud service, wherein the hub account is a second cloud account having a second cloud-provider account identifier, wherein the first event driven function invokes an inventory API that provides an application identifier;

receive, by a second event driven function, the inventory data from the messaging queue, wherein the second event driven function is associated with the hub account;

write, by the second event driven function, the inventory data to a first database, wherein the first database is associated with the hub account;

execute, by a third event driven function, a first query of the first database, wherein the first query retrieves the inventory data, and wherein the third event driven function is associated with an administrative account provided by the public cloud service;

executing, by a front-end application, a second query of a second database, wherein the second database is hosted on a backend of a subscribing organization, and wherein the second query retrieves an identifier of the spoke account based on an identifier of a user; and displaying the inventory data via the front-end application.

11. The system of claim 10, wherein the spoke account, the hub account, and the administrative account are associated with the subscribing organization.

12. The system of claim 11, wherein the first event driven function, the second event driven function, and the third event driven function are provided by the subscribing organization.

13. The system of claim 12, wherein the spoke account is configured to execute an associated cloud application.

14. The system of claim 13, wherein the associated cloud application is provided by the subscribing organization.

15. The system of claim 14, wherein the inventory data includes an application name.

16. The system of claim 11, wherein the front-end application is a cloud application associated with the administrative account.

17. The system of claim 16, wherein the one or more computer processors are configured to:

authenticate, via the front-end application, the user of the front-end application, and determine, based on the authentication, the identifier of the user.

18. The system of claim 10, wherein the first query retrieves the inventory data based on the identifier of the spoke account.

* * * * *